(12) United States Patent
Kedziora

(10) Patent No.: US 7,705,736 B1
(45) Date of Patent: Apr. 27, 2010

(54) METHOD AND APPARATUS FOR DATA LOGGING OF PHYSIOLOGICAL AND ENVIRONMENTAL VARIABLES FOR DOMESTIC AND FERAL ANIMALS

(76) Inventor: John Kedziora, 17282 Balch Pl., Mannsville, NY (US) 13661

( * ) Notice: Subject to any disclaimer, the term of this patent is extended or adjusted under 35 U.S.C. 154(b) by 271 days.

(21) Appl. No.: 12/016,825

(22) Filed: Jan. 18, 2008

(51) Int. Cl.
*G08B 23/00* (2006.01)
(52) U.S. Cl. .................................. 340/573.3
(58) Field of Classification Search ............. 340/573.3, 340/573.1, 573.2, 539.13; 119/712
See application file for complete search history.

(56) References Cited

U.S. PATENT DOCUMENTS

| | | | |
|---|---|---|---|
| 3,336,530 A | 8/1967 | Sloan et al. | |
| 5,900,818 A * | 5/1999 | Lemnell | 340/573.3 |
| 5,923,254 A | 7/1999 | Brune | |
| 6,311,644 B1 * | 11/2001 | Pugh | 119/712 |
| 6,408,233 B1 | 6/2002 | Solomon et al. | |
| 6,970,090 B1 | 11/2005 | Sciarra | |
| 6,985,107 B2 | 1/2006 | Anson et al. | |
| 7,026,941 B1 | 4/2006 | Anderson | |
| 7,076,348 B2 | 7/2006 | Bucher et al. | |
| 7,350,481 B2 * | 4/2008 | Bar-Shalom | 119/859 |
| 2002/0010390 A1 | 1/2002 | Guice et al. | |
| 2005/0162279 A1 * | 7/2005 | Marshall et al. | 340/573.2 |
| 2006/0027185 A1 | 2/2006 | Troxler | |
| 2006/0028186 A1 * | 2/2006 | Yan | 323/225 |

FOREIGN PATENT DOCUMENTS

| | | |
|---|---|---|
| CA | 2 396 997 | 2/2004 |
| GB | 2 387 465 | 10/2003 |
| WO | WO03/79773 | 10/2003 |
| WO | WO2005122755 | 12/2005 |

* cited by examiner

*Primary Examiner*—Phung Nguyen
(74) *Attorney, Agent, or Firm*—Michael I Kroll

(57) ABSTRACT

A GPS data acquisition collar incorporating an individualized rugged watertight collar that monitors factors including GPS location, gazing patterns, elevation, feeding patterns, temperature, movement speed, sleep patterns and signaling or beacon tracking options. Additionally the present invention provides options for visual representation or programming alerting of factors that may affect an animal or herd of animals in a monitored and recorded environment.

15 Claims, 11 Drawing Sheets

METHOD AND APPARATUS FOR DATA LOGGING OF PHYSIOLOGICAL AND ENVIRONMENTAL VARIABLES FOR DOMESTIC AND FERAL ANIMALS

BACKGROUND OF THE INVENTION

1. Field of the Invention

The present invention relates generally to animal husbandry and, more specifically, to an unobtrusive method and apparatus for acquiring physiological and environmental data concerning the habits and mode of living for domestic and feral animals.

The apparatus comprises a buckled collar having a power supply module and data acquisition module attached thereto. The power supply module having an integral watertight electrical connector is designed to be field replaceable by disconnecting the module from the collar and fastening a replacement module to the collar. To aid the user in replacement the power supply module provides a post mateable to a collar notch, both forming a keyway, to prevent reverse polarization. Also provided are color coded indicators as a further indicator of correct assembly.

One of the primary features of the data acquisition module is a SD card (Secure Digital Memory Card) with non-volatile high-density memory. The card provides the user with means for specifying parametric control data via a personal computer and simple text editor depending on the type of study being performed. This alleviates the user from having to return the collar for factory reconfiguration thereby adding a dynamic aspect to any study not found within the industry.

Along with the SD card the data acquisition module contains a GPS receiver for programmed time dependent recording of collar location which is stored on the SD card. The data acquisition module also contains a two-axis accelerometer for measuring the pitch and roll angle of the collar indicative of grazing, lying down and head posture. The present invention alternately provides for a third axis compass bearing sensor.

Further provided is a temperature sensor for recording the ambient temperature. The temperature sensor is thermally insulated from the collar providing a more accurate ambient temperature reading.

In addition to the aforementioned sensor a VHF transceiver is incorporated into the data acquisition module providing means for transmitting data on a preprogrammed basis. The SD card maintains the transmitted data should the transmission be lost. In addition to the transmission of data, the data acquisition module provides for beacon only transmission should preprogrammed parameters indicate that the batteries are low or there is no collar movement, for example: either the collar fell off or the animal is dead. The periodic transmissions provide means for locating the collar via a directional antenna and receiver or other radio-direction finding means.

In operation the GPS data acquisition collar provides means for collecting physiological and environmental data such as GPS location, gazing patterns, ambient temperature and movement providing analytical data for managing water and food resources in addition to environmental impacts such as buildings, fences and herd density. The integral VHF transceiver provides for recovery of the collar for stored data retrieval and field replacement of low batteries using the beacon only mode.

2. Description of the Prior Art

There are other animal tracking devices designed for tracking livestock. Typical of these is U.S. Pat. No. 3,336,530 issued to Sloan et al. on Aug. 15, 1967.

Another patent was issued to Lemnell on May 4, 1999 as U.S. Pat. No. 5,900,818. Yet another U.S. Pat. No. 5,923,254 was issued to Brune on Jul. 13, 1999 and still yet another was issued on Jun. 18, 2002 to Solomon et al as U.S. Pat. No. 6,408,233.

Another patent was issued to Sciarra on Nov. 29, 2005 as U.S. Pat. No. 6,970,090. Yet another U.S. Pat. No. 6,985,107 was issued to Anson et al on Jan. 10, 2006. Another was issued to Guice on Jan. 24, 2002 as U.S. Patent Application No. 2002/0010390 and still yet another was issued on Feb. 9, 2006 to Troxler as U.S. Patent Application No. 2006/0027185.

Another patent was issued to Anderson on Apr. 11, 2006 as U.S. Pat. No. 7,026,941. Yet another U.S. Pat. No. 7,076,348 was issued to Bucher et al. on Jul. 11, 2006. Another was issued to O'Nuallain on Apr. 7, 2003 as British Patent No. GB2387465 and still yet another was issued on Mar. 21, 2002 to Thorstensen as PCT Patent No. WO03079773.

Another patent was issued to Fortuna on Jun. 17, 2004 as PCT Patent No. WO2005122755. Yet another Canadian Patent No. CA2396997 was issued to Grush on Aug. 7, 2002.

U.S. Pat. No. 3,336,530

Inventor: R. J. Sloan et al.

Issued: Aug. 15, 1967

A direction finding system comprising in combination:

A. a portable radio transmitter carried by moving body, said transmitter having.

(1) an oscillator developing high frequency electrical energy (2) an omni directional antenna coupled to said oscillator to radiate said electrical energy into space in the form of radio signals.

(3) a modulator including an a stable multi vibrator and a capacitor connected to said oscillator to pulse modulate said radio signals, and (4) acceleration responsive means comprising a switch operating to short out said capacitor in response to movement of said body so as to vary the pulse modulating rate of said modulator according to the motional activity of said body; and.

B. a remotely located receiver tuned to the frequency of said radio signals transmitted by said transmitter, said receiver having (1) a directional antenna responding to said radio signals, (2) a demodulator connected to said directional antenna to demodulate said radio signals, and (3) output means connected to said demodulator to provide an indication of the direction from said receiver to said transmitter and the activity of said moving body carrying said transmitter.

U.S. Pat. No. 5,900,818

Inventor: Per Arne Lemneli

Issued: May 4, 1999

The present invention relates to a tracking system for indicating the direction and behavior of an animal such as a hunting dog. The system generally comprises a radio frequency transmitter for mounting on the animal's collar and a hand-held receiver which is capable of detecting and indicating not only the location of the animal but its behavior. The transmitter has a detector connected to a CPU which generates pulse train signals depending on the barking characteristics of the animal. The receiver receives the signals and indicates the animal's barking characteristics by light or sound signals and/or pulses. These indications help the user determine the animal's behavior, such as when the animal travels beyond ordinary sight and hearing range, which can be useful in hunting applications.

U.S. Pat. No. 5,923,254

Inventor: Scott A. Brune

Issued: Jul. 13, 1999

A field programmable tracking device which includes a programmably channelized multichannel transmitter. The transmitter includes a magnetically operable circuit which allows external programmability of transmission channel selection. Activation of the magnetically operable circuit for a first period of time activates a microcontroller. Continued activation of the magnetically operable circuit for a second period of time causes the microcontroller to initiate a verified channel count. Once a desired channel count is verified, activation of the magnetically operable circuit is stopped to select the desired channel. The transmitter is provided with a flexible antenna. Both the transmitter and the flexible antenna can be coupled to a collar.

U.S. Pat. No. 6,408,233

Inventor: Gary Robert Soloman et al

Issued: Jun. 18, 2002

There is provided an automated download vehicle monitoring system for use with a vehicle. The monitoring system is provided with a GPS receiver which is installed in the vehicle. The GPS receiver is configured to receive a GPS locational signal. The monitoring system is further provided with a data logger which is configured to store logged data therein. The data logger is in electrical communication with the GPS receiver for receiving therefrom GPS locational data representative of the received GPS locational signal. The data logger is configured to incorporate the received GPS locational data with the logged data. The monitoring system is further provided with a download controller which is in electrical communication with the data logger for retrieving logged data therefrom. The download controller is configured to determine a vehicle location of the vehicle based upon the received GPS locational signal. The download controller is configured to determine a vehicle distance between the vehicle location and a base station location. The monitoring system is further provided with a vehicle download transmitter which is in electrical communication with the download controller. The vehicle download transmitter is configured to automatically transmit the logged data in response to the determined vehicle distance being less than a predetermined download distance. The monitoring system is further provided with a base station receiver which is configured to receive the transmitted logged data from the vehicle download transmitter.

U.S. Pat. No. 6,970,090

Inventor: Michael Sclarra

Issued: Nov. 29, 2005

A pet tracking collar comprises a length of clear flexible tubing having a fastener adapted to fasten around the pet. Hermetically sealed within the tubing is an electrical ribbon cable extending through the length thereof. A plurality of light-emitting diodes, visible through the clear tubing, are wirelessly connected at spaced intervals to the cable. The tracking collar also includes an antenna within the electrical ribbon cable, and a radio transmitter secured to the cable adapted to transmit a radio frequency signal. The cable is secured within the flexible tubing such that strain along the length of the tubing is not transmitted to the cable therein. The collar's battery compartment has sufficient clearance between the battery and walls of the battery compartment to shed water after the collar is wetted. A radio frequency signal receive determines direction or distance of the collar with respect to the receiver.

U.S. Pat. No. 6,985,107

Inventor: Peter Anson et al

Issued: Jan. 10, 2006

This invention relates to a method and system for the radio location of CDMA and non-CDMA enabled transmitters within a reception zone. The invention exploits the superposition of antenna patterns that create complex and asymmetrical interference structures at very small scales. By randomly distributing a random antenna array of M elements across a two or three-dimensional surface, fine scale interference structures on the scale of ¼ the carrier wavelength are generated. Once the minimum number of antennas are placed, additional antennas will not improve the resolution. Such interference structures when sampled at ⅛ the carrier wavelength or greater yields unique spatial patterns with respect to a given antenna array geometry and transmitter location. The invention incorporates signature recognition (matching) and orthogonal sub-space projection estimators to derive location estimates of a radio transmitter.

U.S. Patent Application Number 2002/0010390

Inventor: David Lehmann Guice

Published: Jan. 24, 2002

A method and system (i.e., an Automated Animal Health Monitoring System—AAHMS) for automated monitoring and early warning of changes in parameters related to the health and status of animals is disclosed. The system includes implantable wireless "smart telesensor" elements that can be implanted within the animal where they measure, and may transmit, temperature and other parameters (e.g., blood oxygen, accelerations, vibrations, heart rate) related to the health and status of the animal being monitored. Optional relay elements may comprise simple transponders to boost the signals from the smart sensor elements and retransmit processed results. The system includes devices for alerting personnel responsible for care of the animals and identifying the animal needing attention. Installation tools include optional capabilities to program the smart sensor elements to adapt to animal type, season, diet, or other user needs, and to read and correlate electronic and machine read data with human readable animal identification (e.g., ear or collar tags).

U.S. Patent Application Number 2006/0027185

Inventor: Robert Ernest Troxler

Published: Feb. 9, 2006

A collar to be worn on an object or a large or small animal has been designed incorporating (D)GPS technology. The operation of the device includes programming the three dimensional boundary into the memory of the device and simply installing the collar on the animal. As the animal approaches the preprogrammed boundary, a first alarm sounds when the subject is within an arbitrary user defined distance, and a second more drastic alarm such as a shock correction is applied when the subject approaches a second position closer to the boundary. Means to easily program the device are also included in the system. The device has the capability to call or transmit important information such as location, speed, identity, and medical parameters, etc. to a station automatically or when polled. All necessary analog and digital circuitry, microprocessor, programming, communications hardware are integrated into the collar. The device also has applications in land, air and sea navigation, farming, construction, tracking stolen vehicles, and keeping track of children. This device could also be embedded in a specialized lawnmower that would know where your yard ended and your neighbor's began, and traverse around all obstacles in the yard. Important Military applications would include warning and directing soldiers of front line boundaries, minefield mapping and 3D direction around MOA's for aircraft.

U.S. Pat. No. 7,026,941

Inventor: John William Crisman Anderson

Issued: Apr. 11, 2006

The present invention 10 provides a system and method of monitoring and tracking a plurality of physical variables from a remote location. The invention 10 utilizes a plurality of radio frequency identification transponders 20 each coupled with a sensor for measuring physical data. The transponders 20 are powered by a radio frequency reader/interrogator 60 that provides radio frequency excitation to the transponders 20 and receives and demodulates back scattered signals therefrom. The invention 10 is particularly advantageous in monitoring temperature in cattle herds as an aid to early diagnosis of bovine respiratory disease.

U.S. Pat. No. 7,076,348

Inventor: Corey W, Bucher et al

Issued: Jul. 11, 2006

A monitoring system for an outdoor power implement. The monitoring system comprises an accelerometer, a GPS receiver, a processing module, and a storage device. The accelerometer collects impact force data of the outdoor power implement. The GPS receiver collects position data of the outdoor power implement. The processing module is coupled to the accelerometer and the GPS receiver and has a filter module operable to receive the impact force data from the accelerometer, filter the impact data, and provide filtered impact data. The filter module comprises a resistor capacitor filter circuit having a cutoff frequency at 50 Hz. The processing module also has a data extraction module operable to receive the positioning data from the GPS receiver. The storage device is coupled to the processing module and is operable to record the filtered impact data and the positioning data. The outdoor power implement may include a lawnmower.

U.K. Patent Number GB2387465

Inventor: Rusiri O'Nuallain

Issued: Apr. 7, 2003

A livestock monitoring system has RFID animal tags (2) which include GPS capability for real time monitoring of animal location. Animal identifiers and locations are uploaded in a local area wireless network to a receiver (3). The receiver (3) in turn uploads the data to a Web server (5) linked to a host processor (7) for databases (7-10). These databases are also updated by external systems (12-15) with medical and regulatory data. This provides for comprehensive real time animal monitoring.

International Patent Application Number WO03/079773

Inventor: Bjorn Thorstensen

Published: Mar. 21, 2003

A system and method of tracking individuals divided into flocks by means of radio communication and positioning systems is disclosed. A flock leader is provided with a first electronic device (1) comprising a first transceiver (2) operating in a public radio communication network, e.g. GSM or GPRS, a position tracker (3), e.g. a GPS-receiver, and a second transceiver (4) operating in a short distance radio communication system, e.g. Bluetooth®. Each of the remaining individuals in the flock is provided with a second electronic device (6) comprising at least a third transceiver (7) also operating in the short distance radio communication system. The second electronic device (6) periodically transmits data identifying the associated individual to the first electronic device (1), so that the flock leader knows that the individual is localized in the flock (i.e. within the coverage area of the short distance radio communication system) as long as it receives the data. The first electronic device (1) communicates with a system controller through a public radio communication network managing the system and keeping track of the individuals in each flock.

International Patent Application Number WO2005/122755

Inventor: Agnes Fortuna

Published: Jun. 17, 2004

The invention relates to an implantable data carrier unit for animals as well as a system and method for determining the position of and identifying an animal, comprising a GPS unit (6) for determining the position of the animal (11) by a satellite-aided locating system (12, 16, 17), a transponder (3) to which a memory unit (21) having a first memory (22) is assigned, whereby the first memory (22) provides a data key (10) assigned to the animal (11), and a power source (8) assigned to the GPS unit (6). An implantable data carrier unit for animals, which enables a sure and reliable identification and determination of the position of the animal while, at the same time, being easy to implant in the animal is designed in such a manner that the GPS unit (6) has an inactive first state and an active second state, the GPS unit (6) can be externally switched from the inactive first state and into the active second state, and the transponder (3) transmits, on request, the data key (10) assigned to the animal (10).

Canada Patent Number CA2396997

Inventor: Bernard Grush

Issued: Aug. 7, 2002

The present invention discloses a system and methods and processes to capture, filter and compress geometrically accurate, time-marked, paths (digital path maps or DPMs) taken by persons, animals, packages, vehicles or robots. These methods and processes can be stored and executed on small format devices for handheld, wearable, embeddable or implantable applications. This invention, often in conjunction with other processes operating on other technologies such as, but not limited to, personal computer or portal technologies, has realtime applications in military, paramilitary, exploration, remote sensing, wildlife studies, pet and livestock management, agriculture, surveying, large site inspection, parolee management, driver behavior modification, kid's safety, physical security, and certain classes of recreational and competitive sport.

While these animal tracking devices may be suitable for the purposes for which they were designed, they would not be as suitable for the purposes of the present invention, as hereinafter described.

SUMMARY OF THE PRESENT INVENTION

The present invention is a GPS data logger that is intended for gathering data about the behavior of animals, primarily livestock, but in alternate embodiments the collar may be used for wildlife, or other domestic animals. The collar gathers behavior data in several primary ways. The GPS receive provides a periodic position measurement to be made according to a programmable time interval and sensors within the unit for measuring the orientation of the collar using a microelectromechanical system (MEMS) based angle sensor, as well as an ambient temperature sensor. The invention interrogates the angle sensor and the temperature sensor each time a GPS position fix is made. This data allows a researcher, producer (rancher or farmer) or animal care takers to make determinations of many different factors that represent animal behavior. These factors include where and how much time the animal spends time according to time of day, the influence of ambient temperature, and a degree of discrimination between resting, foraging/grazing, or traveling. These temporal and spatial data sets in combination with other data and observation enable a variety of management and behavioral conclusions to be reached more effectively and expediently than possible without this type of telemetry. Examples of this type of phenomena that this data is useful for are: the use or effectiveness of nutrient supplement locations, assist in water resource management, determine grass or forage plant species preferences, provide insight into seasonal or weather dependant behaviors or resource use, the degree of activity relative to other environmental factors, or forage and water availability, the interaction between animals within a herd and when multiple species are present including other livestock, and domestic animals.

While similar devices exist, the specific differences that make this invention unique are related to the reduction of cost and simplification of the unit and its use and maintenance during deployment. The ability to realize use of this type of device for livestock is strongly linked to the cost of the units specifically because operation involving livestock are necessarily for profit, and the cost of acquiring the data cannot exceed the value of the gains made by use of the technology, as is the case in previous inventions.

A primary object of the present invention is to provide a cost effective animal analytics system comprising an animal mountable data logging collar that periodically initiates a transmission receivable by a remote frequency tuned receiver.

Another object of the present invention is to provide a cost effective animal analytics system that stores data on an onboard removable storage device for selective retrieval.

Yet another object of the present invention is to provide the collar for animals taken from the group of domestic and feral animals.

Still yet another object of the present invention is to provide the collar with the functions of data logger, collar system status and transceiver.

An additional object of the present invention is to provide the collar with a latched band incorporating an integral VHF antenna with the collar having a field replaceable power supply module and electronics housing module fastened thereto.

A further object of the present invention is to provide the collar with a latching mechanism that may be electrically or mechanically unlatched under predetermined conditions.

A yet further object of the present invention is to provide the collar band with a weather tight fitting for mounting the field replaceable power supply thereto.

Another additional object of the present invention is to provide an electronics housing comprising a two piece gasketed structure with an exteriorly accessible removable panel providing access to the data logging storage device.

Another object of the present invention is to provide a weather seal for said storage device access panel and housing resident desiccant for absorbing water vapor.

Yet another object of the present invention is to provide an electronics housing having a GPS receiver, VHF Radio, temperature sensor and angle sensor integrated into a circuit using a secure digital memory card for logging data thereto.

Still yet another object of the present invention is to provide the electronic housing manufactured as a two piece gasketed housing forming a weatherproof seal for a potentially long deployment in the field.

A further object of the present invention is to provide for user parametric data concerning the functioning of the collar system.

A still further object of the present invention is to provide a collar for wildlife use wherein the collar will unlatch at a specified time dependant on the user parametric data.

An additional object of the present invention is to provide battery management to extend the operating life of the collar.

Another object of the present invention is to provide a collar beacon for locating the collar with the parametric data and design parameters energizing the beacon mode of the collar using the VHF radio.

An additional object of the present invention is to provide user parametric data sets for periodically transmitting data stored on the data storage medium.

A further object of the present invention is to provide the system with a computer having a sound card and Internet available software for receiving the collar transmitted data for collared animal(s) study.

Yet another object of the present invention is to provide an animal tracking device comprising a collar for recording and analysis of factors including but not limited to GPS location, gazing patterns, elevation, feeding patterns, temperature, movement speed, sleep patterns and signaling or tracking beacon type options.

Still yet another object of the present invention is to provide a means for monitoring animal activity utilizing a tracking collar, GPS and other incorporated data representation and control devices.

A further object of the present invention is to provide a means for monitoring animal activity within a heard of animals while providing near real time data analysis and comparison of factors including but not limited to GPS location, gazing patterns, elevation, feeding patterns, temperature, movement speed, sleep patterns and signaling or tracking beacon type options.

A still yet further object of the present invention is to provide a means for recording and comparing environmental factors that may affect a herd or grouping of animals.

Another object of the present invention is to provide a means for monitoring animal activity utilizing individual rugged watertight collars that monitor such factors as temperature, location and directional speed and vectors.

Yet another object of the present invention is to provide a means for monitoring a herd whereby a graphical interface is provided coordinating the stated factors into a combined visual, historical and statistical representation.

Still yet another object of the present invention is to provide a means for programming a plurality of limits and factors that may affect a herd and alert a user of such a situation.

Additional objects of the present invention will appear as the description proceeds.

The present invention overcomes the shortcomings of the prior art by providing a GPS data acquisition collar incorporating an individualized rugged watertight collar that monitors factors including GPS location, gazing patterns, elevation, feeding patterns, temperature, movement speed, sleep patterns and signaling or beacon tracking options. Additionally the present invention provided options for visual representation or programming alerting of factors that may affect an animal or herd of animals in a monitored and recorded environment.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
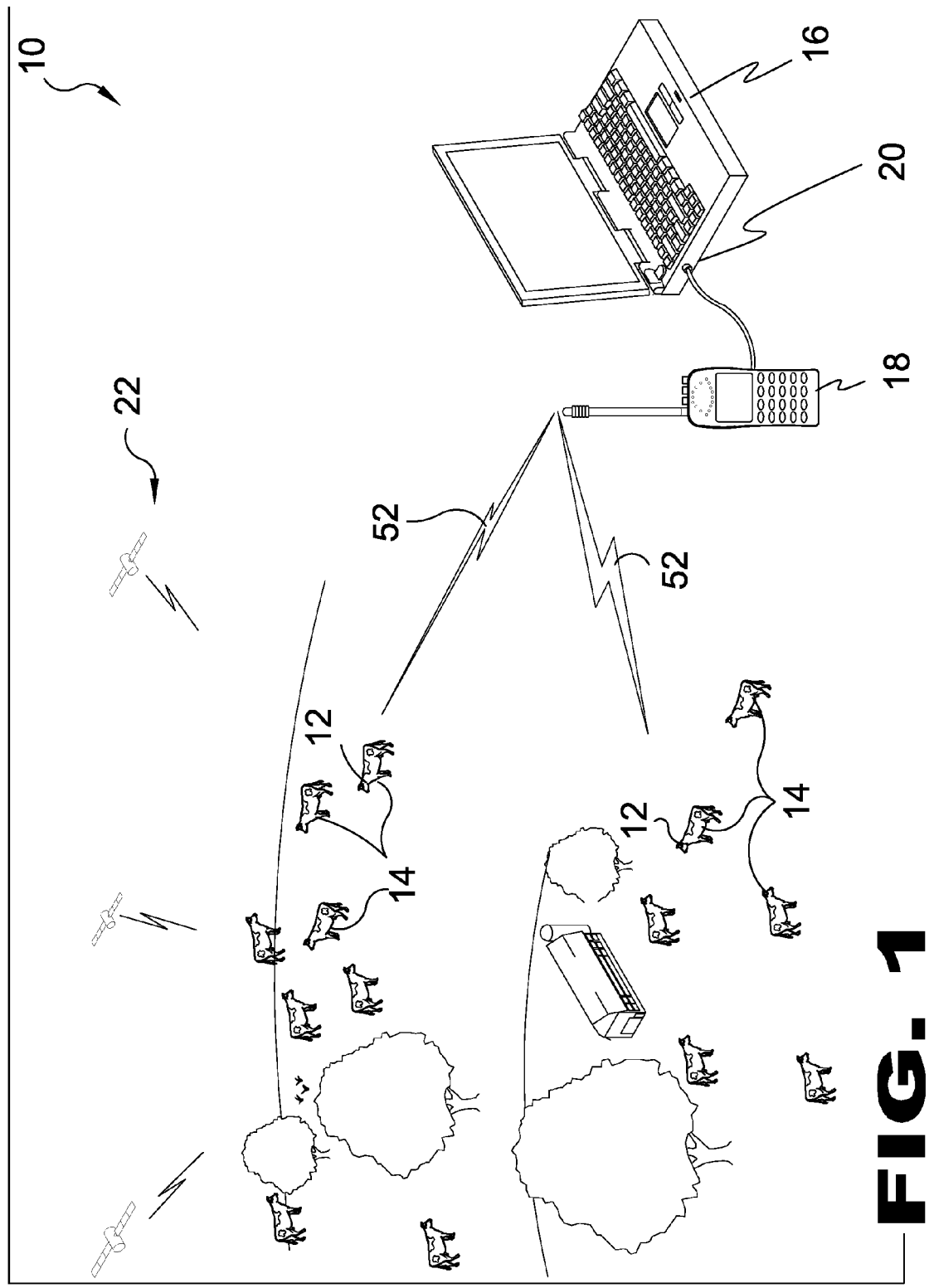
FIG. 1 is an illustrative view of the data acquisition collar in use.

Turning now descriptively to the drawings, in which similar reference characters denote similar elements throughout the several views, the figures illustrate the Method and Apparatus for Data Logging of Environmental and Physiological Variables for Domestic and Feral Animals of the present invention. With regard to the reference numerals used, the following numbering is used throughout the various drawing figures.

10 Method and Apparatus for Data Logging of Environmental and Physiological Variables for Domestic and Feral Animals of the present invention,
12 data acquisition collar
14 subject animal
16 computing device
18 telemetry receiver
20 sound card interface
22 GPS satellite system
24 two axis accelerometer
26 pitch of 12
28 roll of 12
30 compass bearing axis sensor
32 yaw
34 release buckle
36 disabling magnet
38 disabling slot
40 data acquisition and transmission module
42 power supply module
44 VHF/data acquisition antenna
46 SD card access cover
48 SD card
50 SD card port
52 beacon
54 water seal gasket
56 fastener
57 fastener recess
60 housing base of 40

62 housing cover of 40
64 housing seal ring
66 circuit board
68 GPS receiver
70 wire way
72 release mechanism
74 male latch element
76 female latch element
78 electronic controller
80 lock pin motor
82 lock pin drive
84 lock pin
86 alignment pin
88 battery
90 electrical connection
92 waterproof seal of 90
94 housing of 42
96 battery connection
98 power connection
100 upper electronic assembly
102 external VHF antenna/antenna feed line
104 internal VHF antenna

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the data acquisition collar 12 of the present invention 10 in use. Illustrated are ruminant subject animals 14 dispersed over a geographical area with each having a data acquisition collar 12 acquiring and storing physiological and environmental data to a removable storage device for computer 16 analysis. The data is also selectively retrievable through periodic VHF FSK data transmission to computer 16 enabled with a telemetry receiver 18 and sound card interface 20. The collar is designed as a latched band 12 having a topside housing portion and a bottom side power supply portion, which is field replaceable, and of a weight to keep the topside housing, which includes GPS 22 positioning to determine movement of the tagged animal, in a topmost collar 12 position. The collar additionally provides for intended collar release and later retrieval via beacon 52 transmission.

Figure 2:
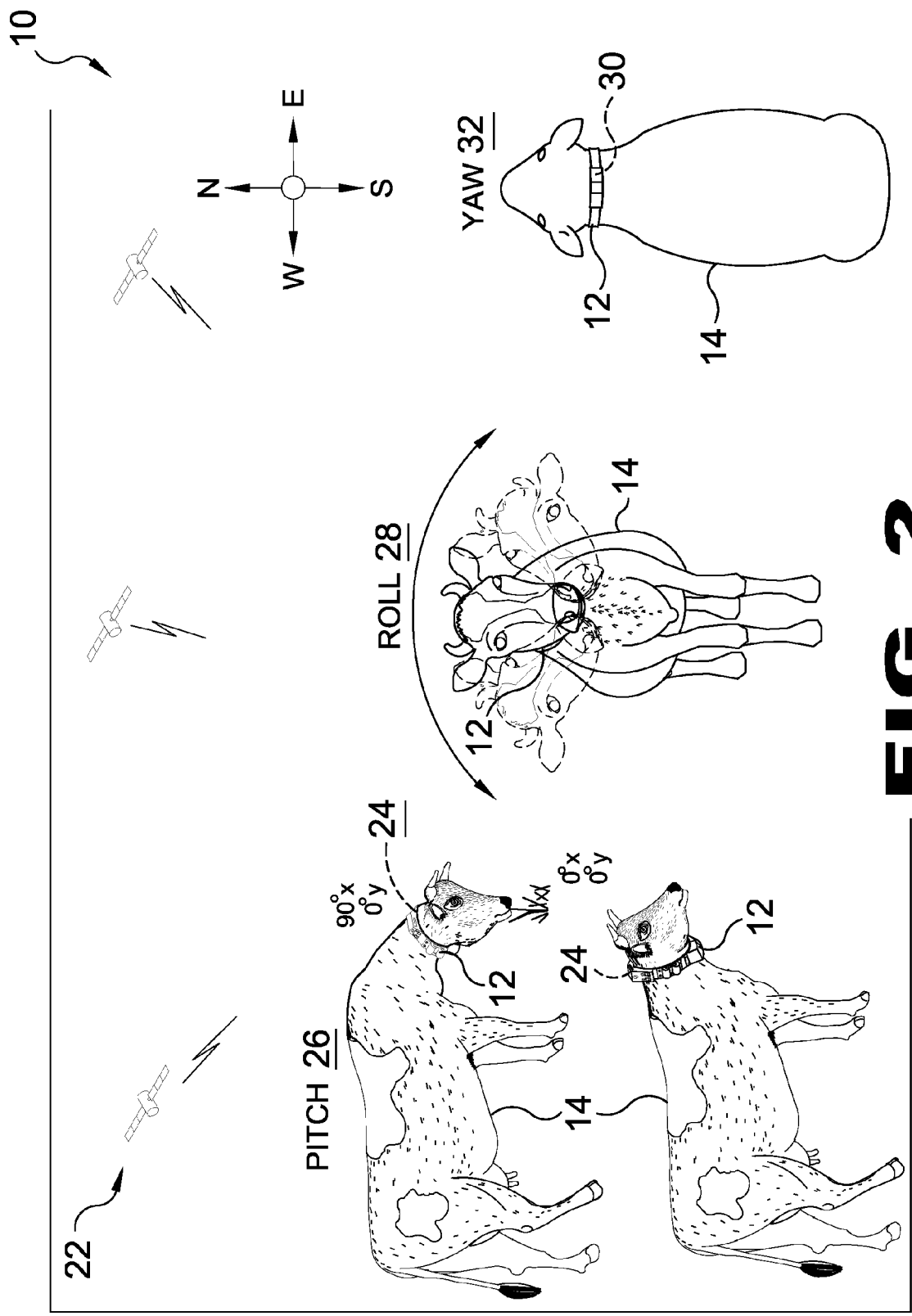
FIG. 2 is an illustrative view of the neck orientation function of the present invention.

FIG. 2 is an illustrative view of the neck orientation function of the present invention 10. The collar 12 of the present invention incorporates a two axis accelerometer 24 for recording and storing pitch 26 and roll 28 of collar-enabled data-acquisition animals 14 to determine foraging or grazing habits, which when included with location (GPS 22 determined), time and ambient temperature, all of which are recorded at preprogrammed intervals, provides preference information on food and water resources. A compass bearing axis sensor 30 may also be employed to determine the yaw 32 of the subject animal 14.

Figure 3:
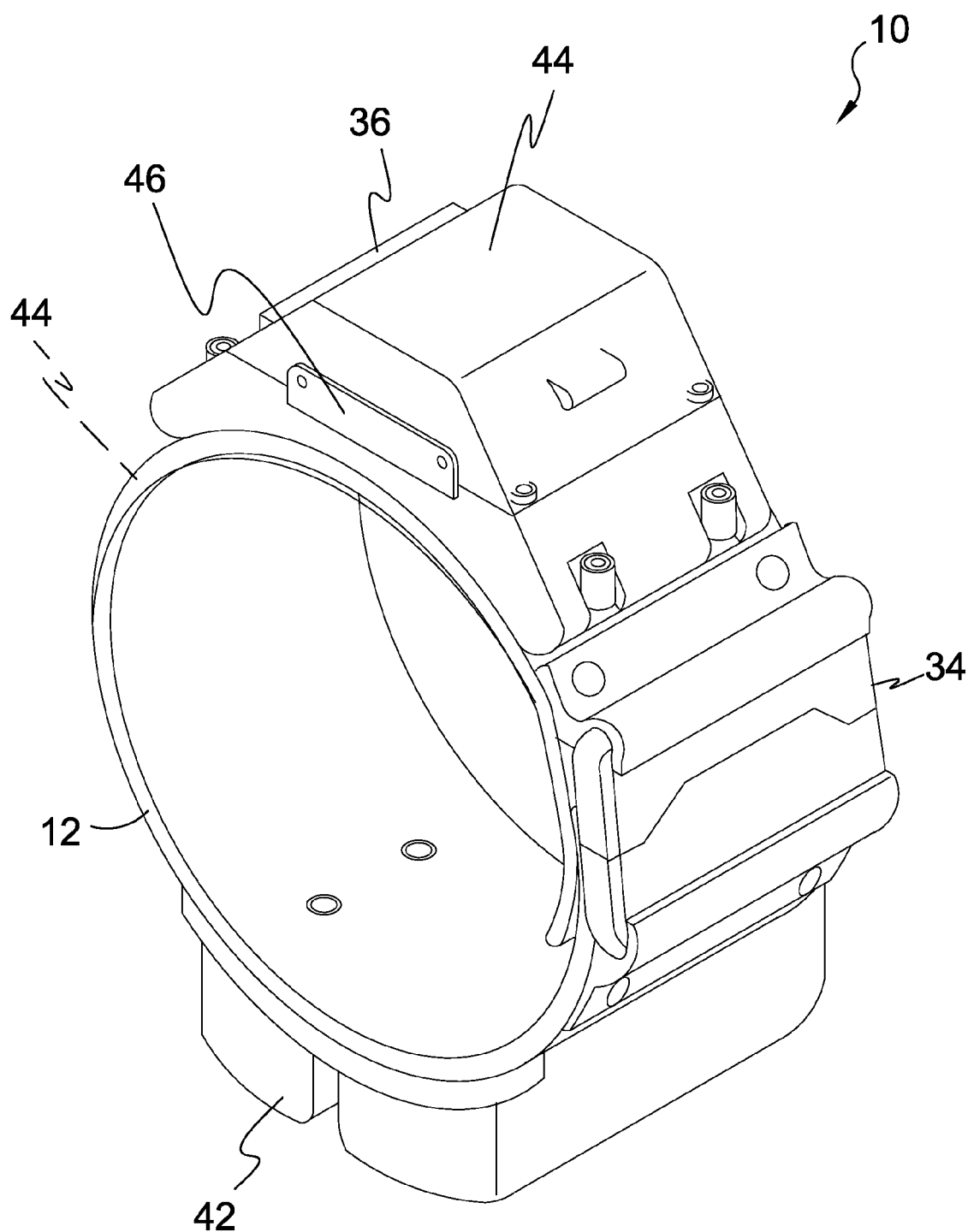
FIG. 3 is a perspective view of the data acquisition collar of the present invention.

FIG. 3 is a perspective view of the data acquisition collar 12 of the present invention 10. The data acquisition collar 12 comprises an appropriately sized collar having a release buckle 34, power supply module 42, a VHF antenna 44, data acquisition module 40 incorporating radio wave data transmission circuitry fastened thereto, a disable magnet 36, and an access cover 46 for an SD card. The power supply module 42 is designed to be field replaceable.

Figure 4:
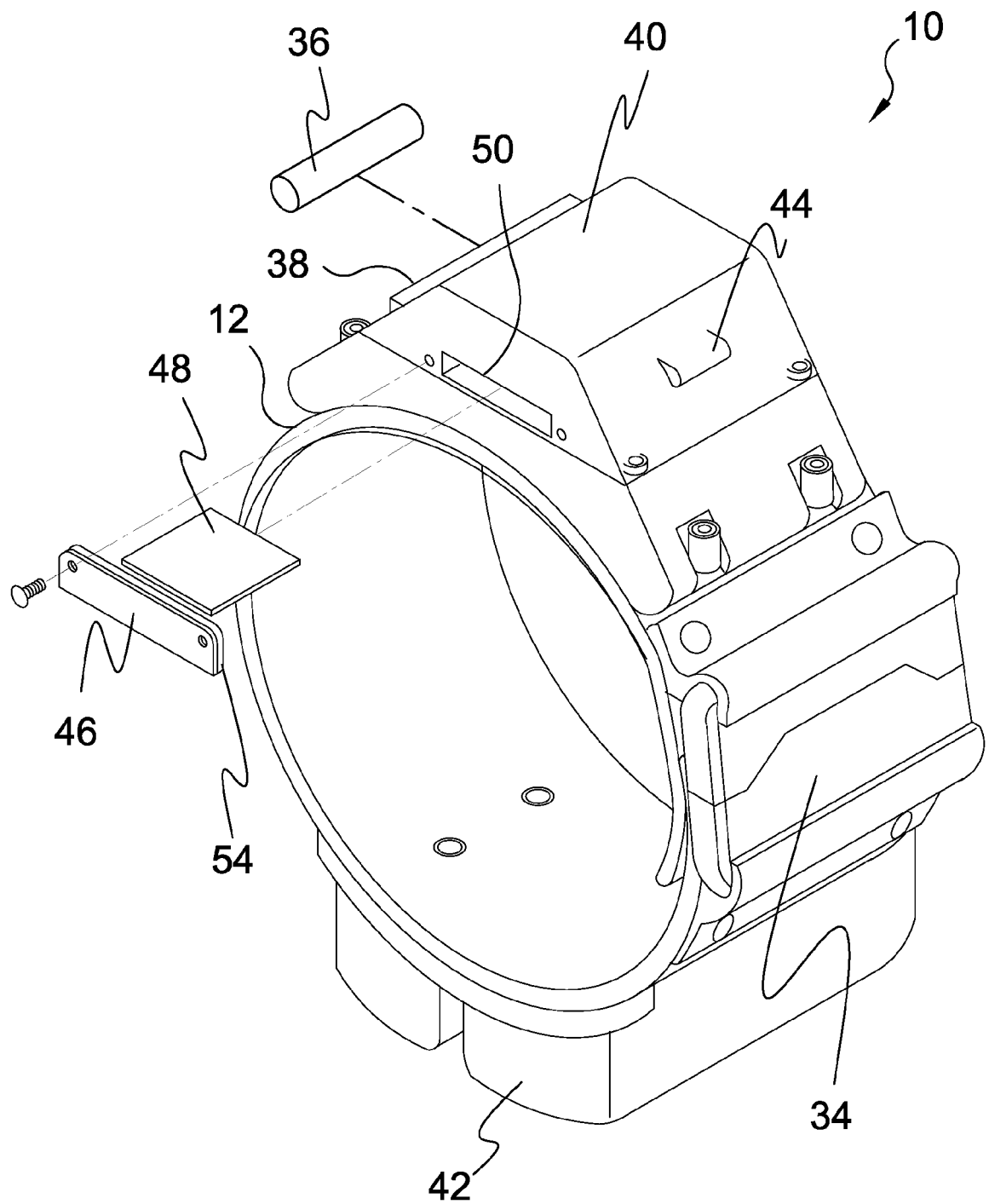
FIG. 4 is a perspective view of the data acquisition collar of the present invention.

FIG. 4 is a perspective view of the data acquisition collar 12 of the present invention 10. The data acquisition collar 12 comprises an appropriately sized collar having a release buckle 34, power supply module 42, a VHF antenna 44, data acquisition and transmission module 40, the disable magnet 36 is displaced from the magnet receiving slot 38, the SD access cover 46 and it's water seal gasket 54 are removed and the data storage SD card 48 is released from the SD card port 50 Radio wave data transmission circuitry is fastened thereto for periodically transmitting the accrued physiological and environmental data with the collar 12 alternately providing for future development of a collar data receiving function.

Figure 5:
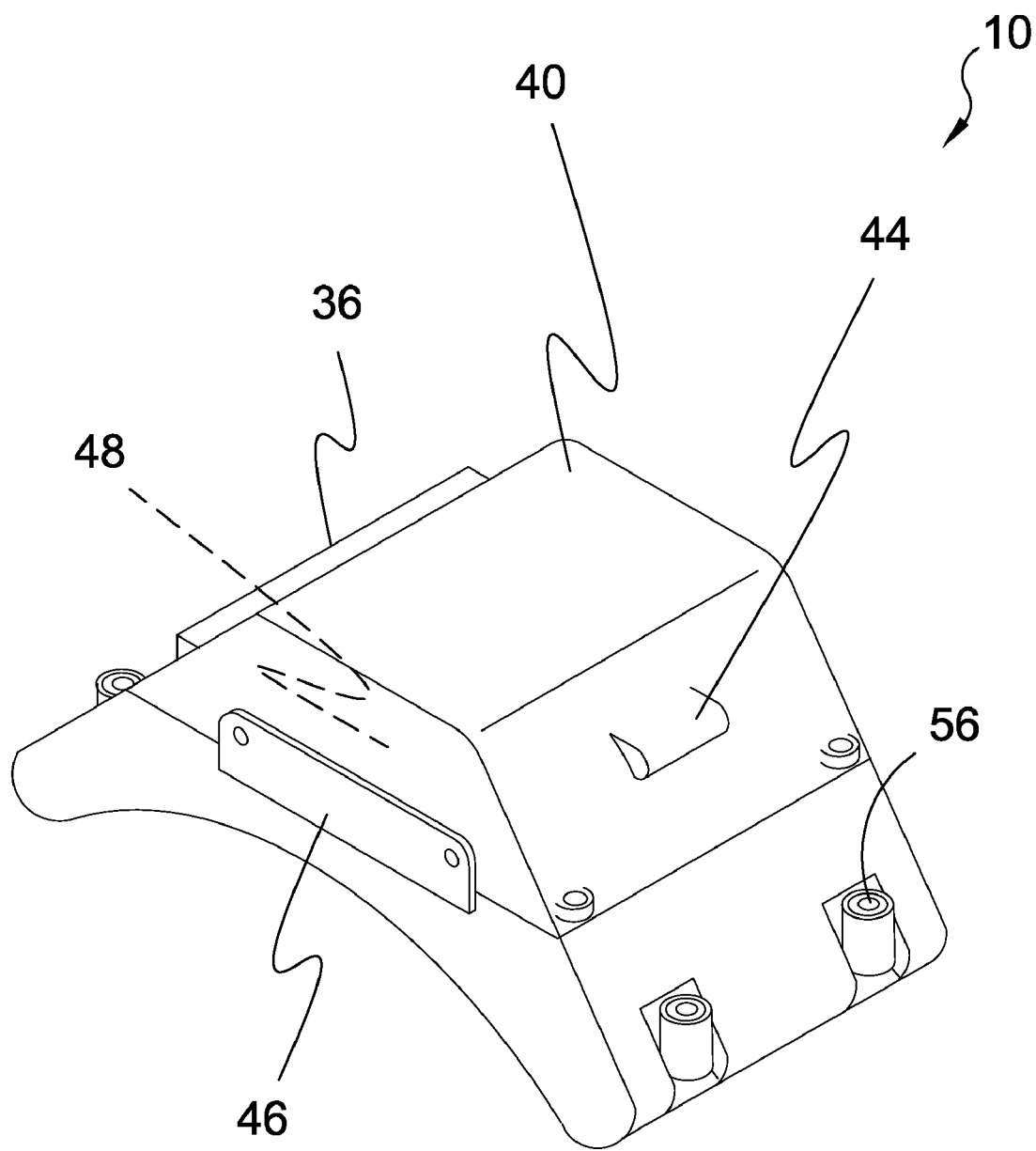
FIG. 5 is a perspective view of the data acquisition and data transmission module of the present invention.

FIG. 5 is a perspective view of the data acquisition and data transmission module 40 of the present invention 10. Shown is the data acquisition and transmission module 40 having a VHF/data acquisition antenna 44, a data storage SD card 48 protected by an SD access cover 46 and collar attachment fasteners 56. The disabling magnet is shown as number 36 and that functions as the power switch.

Figure 6:
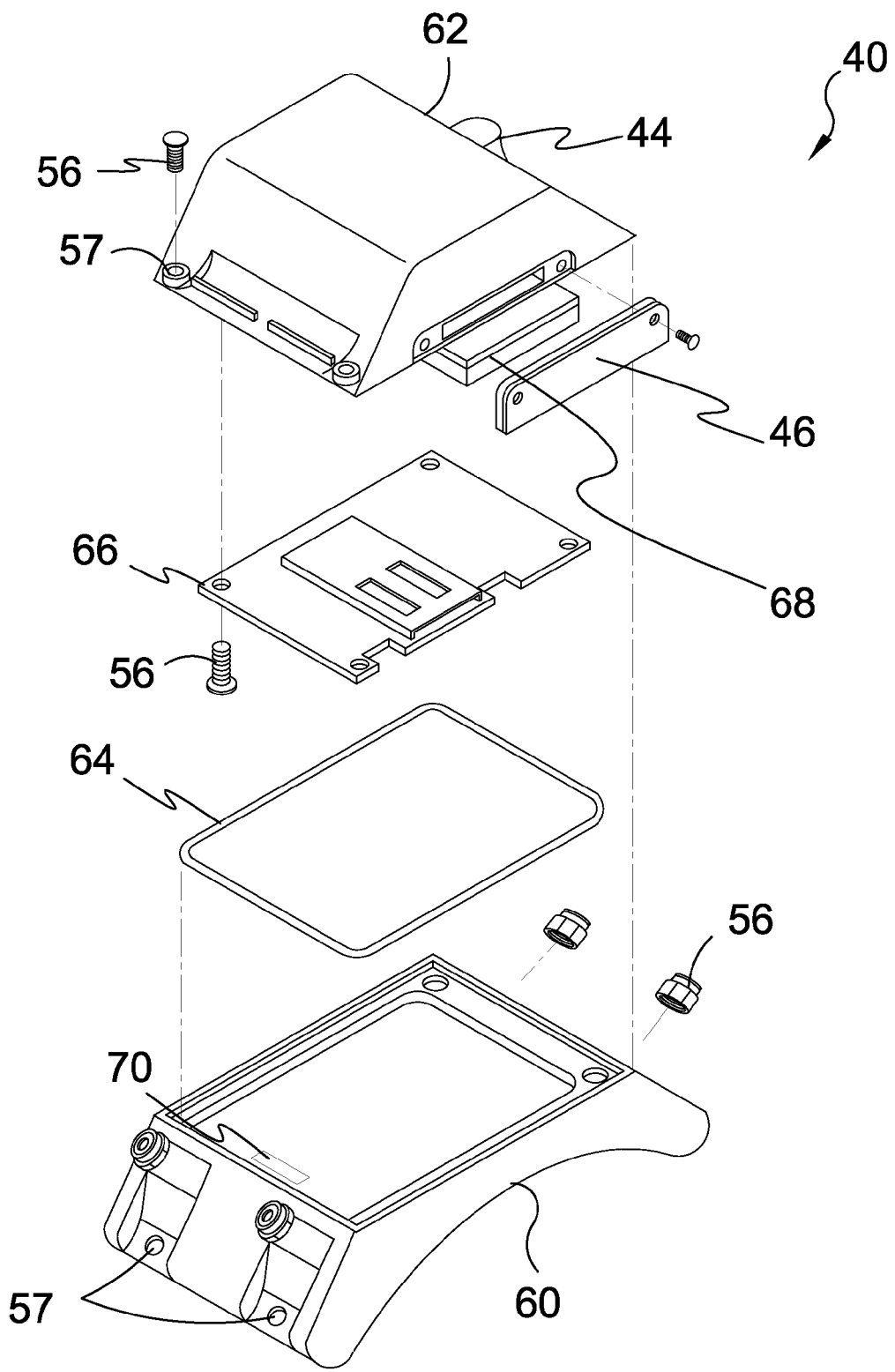
FIG. 6 is an exploded view of the data acquisition and transmission module of the present invention.

FIG. 6 is an exploded view of the data acquisition and transmission module 40. The data acquisition and transmission module 40 is designed as a durable waterproof enclosure having a housing base member 60 and a housing cover member 62 with a housing seal ring 64 therebetween providing a waterproof enclosure housing the electronics of the device. The cover member 62 also provides a removable weather sealed SD access cover 46 as access to the removable storage device. Also shown is the circuit board 66 with GPS receiver 68, external antenna 44, wire way 70 and multiple fasteners 56 and fastener recesses 57. The wire way 70 is where power and VHF RF penetrates the housing 94 for connection to the collar.

Figure 7:
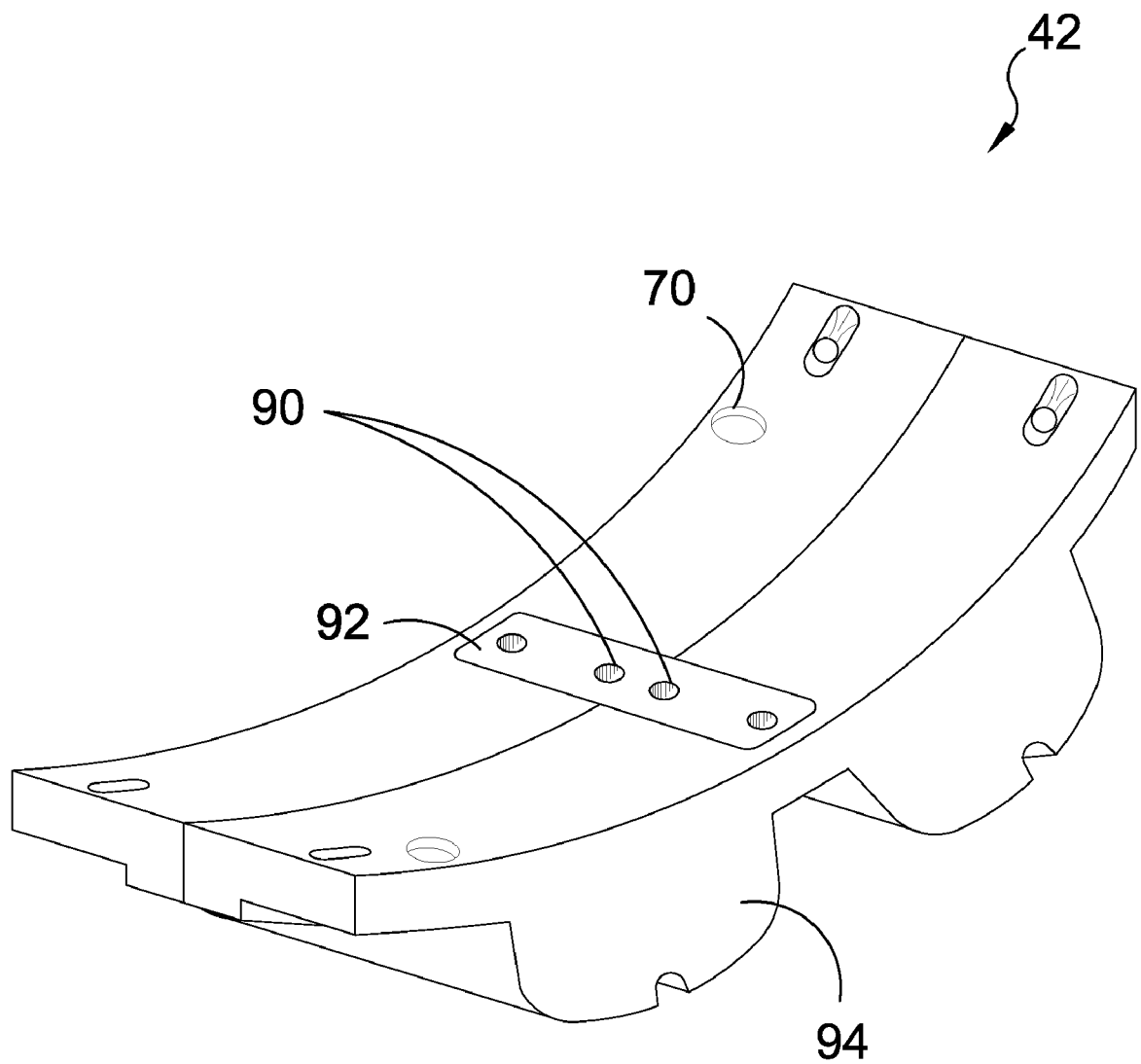
FIG. 7 is a perspective view of the power supply module of the present invention.

FIG. 7 is a perspective view of the power supply module 42 of the present invention. The power supply 42 comprises housing 94 that is attachable to the collar and is designed to be field replaceable. Also shown are the electrical contacts 90 having a weather seal 92 therearound.

Figure 8:
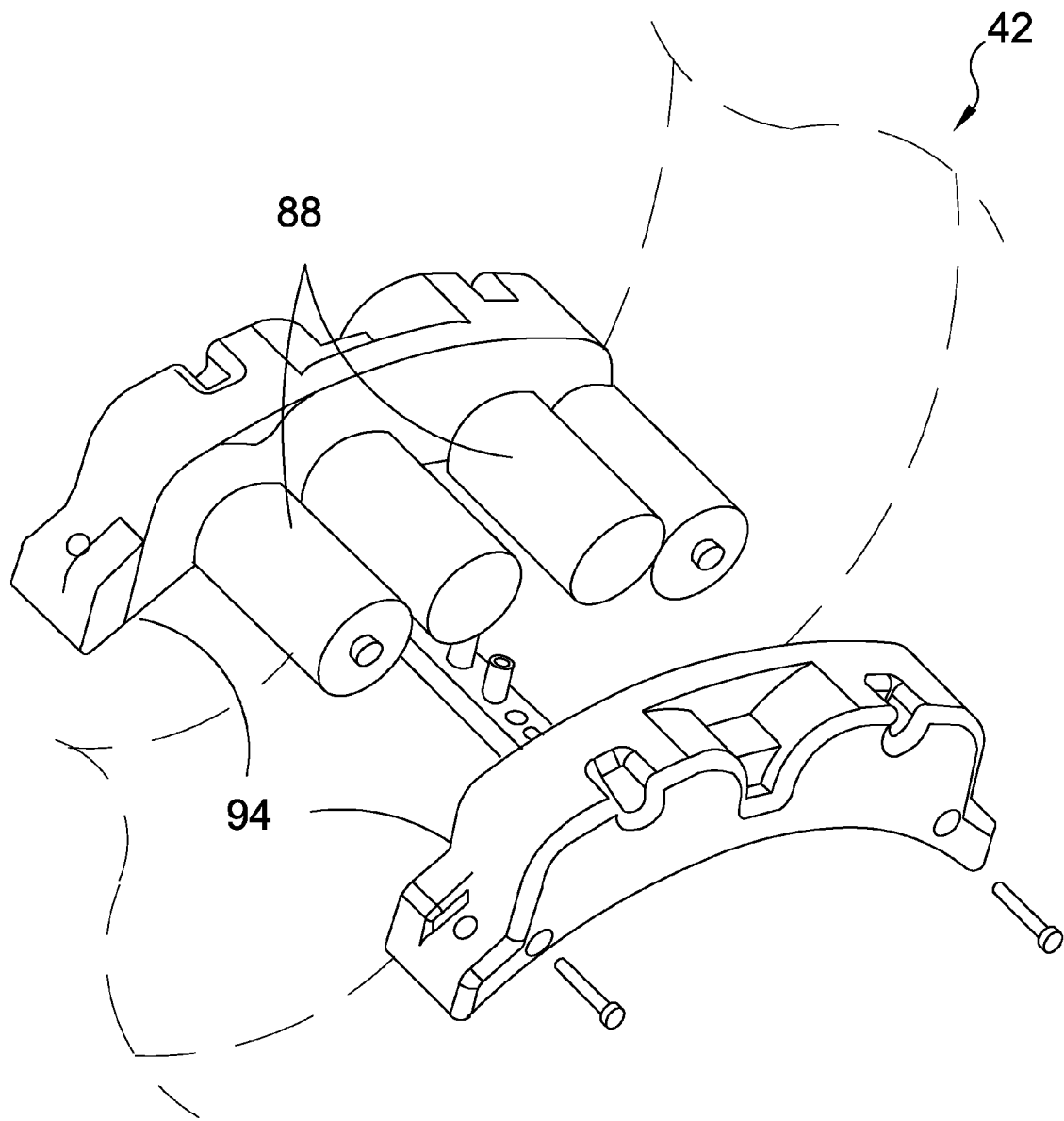
FIG. 8 is an exploded perspective view of the power supply module of the present invention.

FIG. 8 is an exploded perspective view of the power supply module 42. The power supply 42 comprises housing 94 with a plurality of batteries 88 therein that is designed to be field replaceable by removing the power supply module 42 and replacing it with another.

Figure 9:
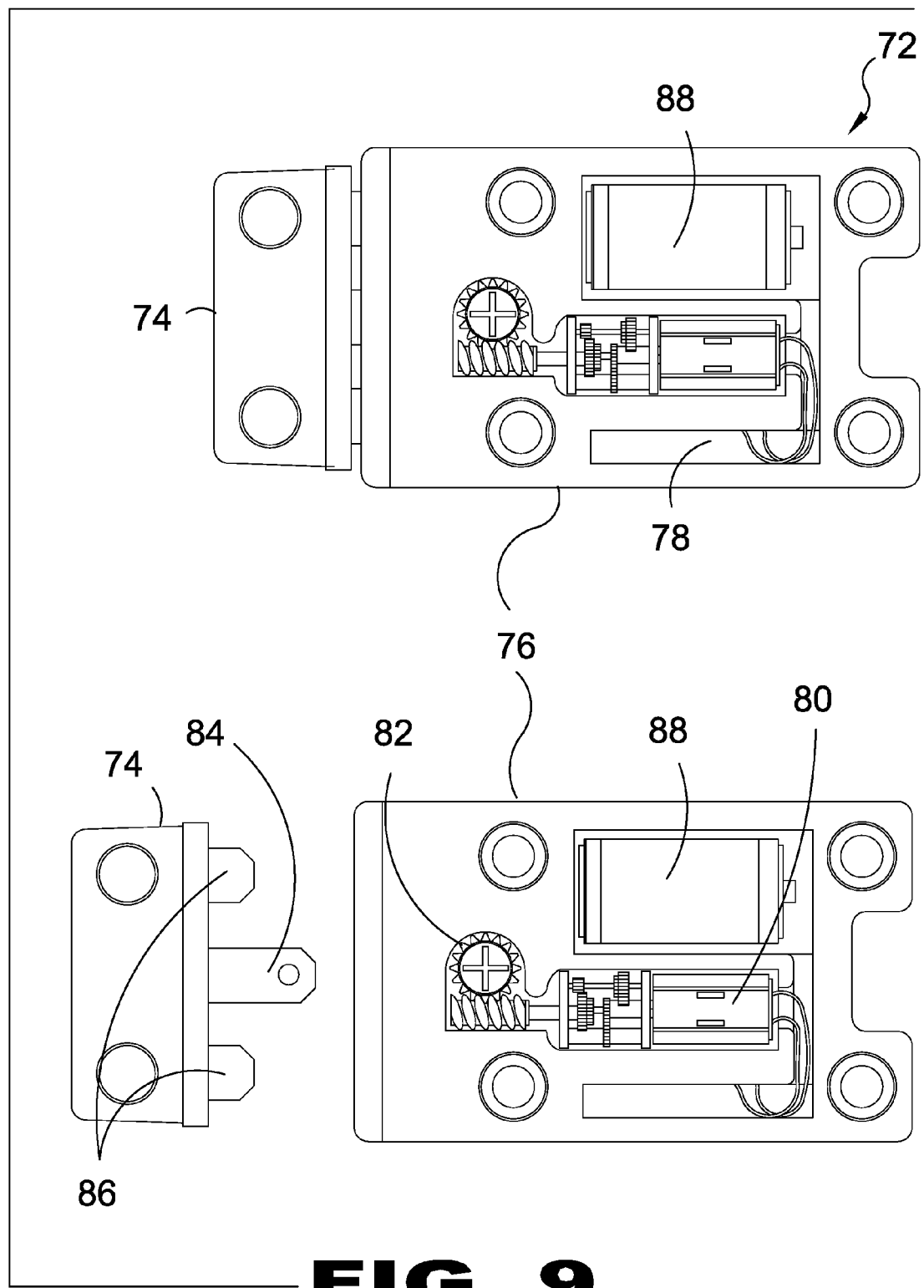
FIG. 9 is a perspective view of an alternate collar fastener that is programmably releasable.

FIG. 9 is a perspective view of an alternate release collar buckle that is programmably releasable. Several types of collar latching mechanism 72 are provided by the present invention including a programmable release mechanism 72 as illustrated having a female latch element 76 with a battery 88, an electronic controller 78, a lock pin motor 80 and a lock pin drive 82. The female latch element 76 has a mating male latch element 74 with a lock pin 84 and a pair of alignment pins 86.

Figure 10:
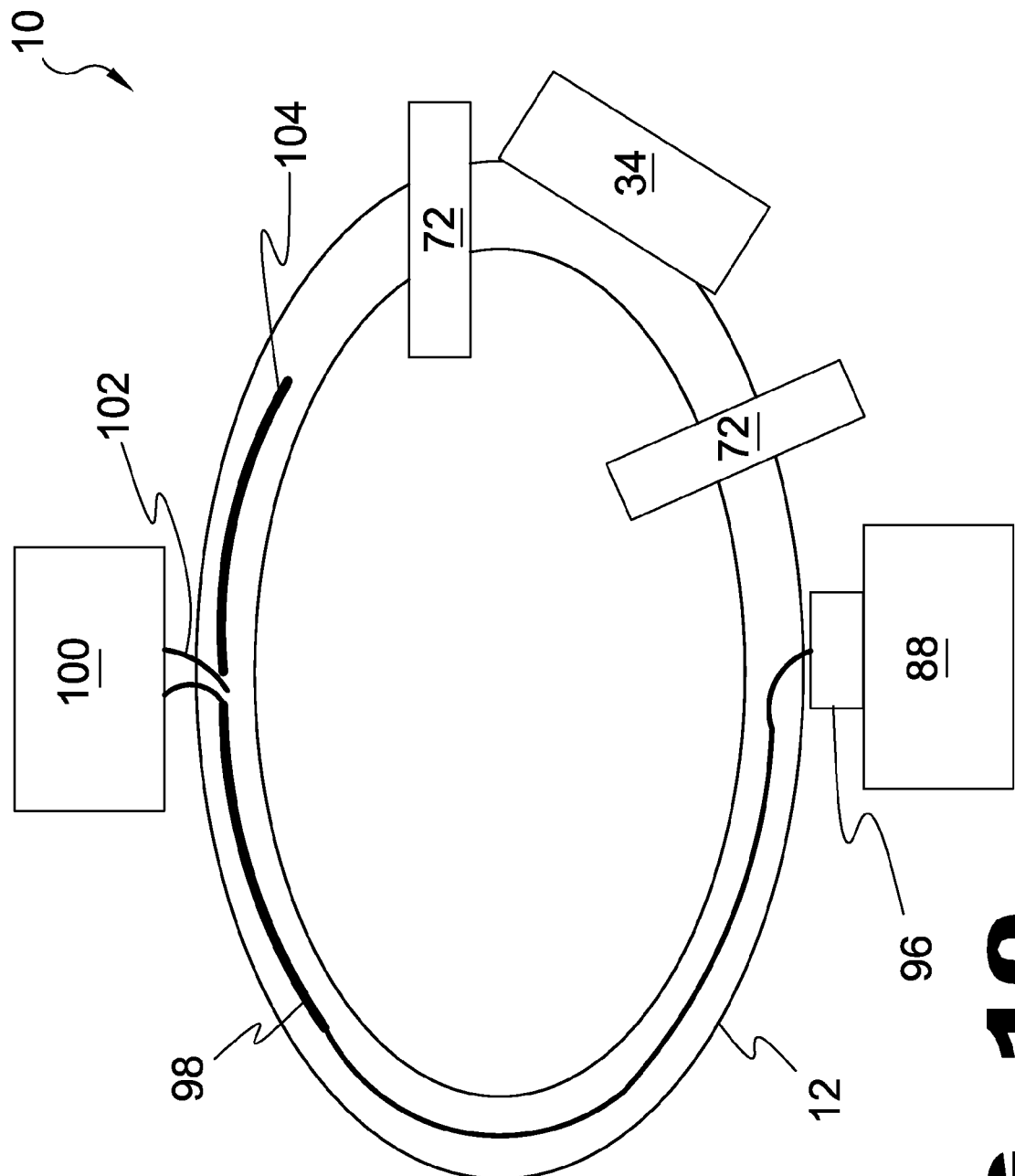
FIG. 10 is a diagrammatic view of the present invention.

FIG. 10 is a diagrammatic view of the present invention 10. Depicted is a diagrammatic view of the collar 12 of the present invention 10 showing electronics connections including the battery 88 (alkaline or lithium), the battery connector 96, the release unit 72 positions for the buckle 34, the power connection 98 the upper electronics assembly 100, the external VHF antenna and antenna feed line 102 and internal VHF antenna 104.

Figure 11:
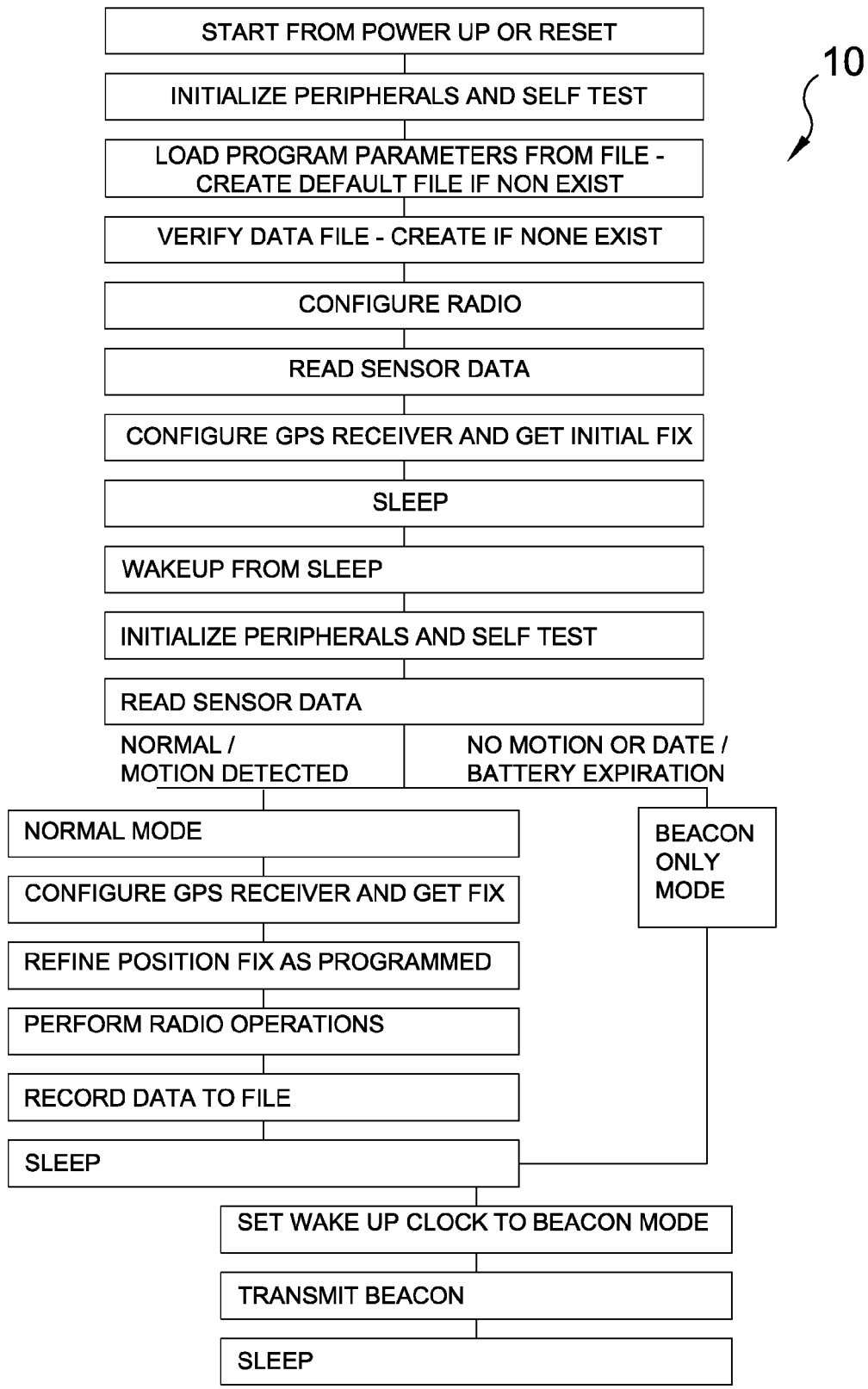
FIG. 11 is a block diagram of the method of the present invention.

FIG. 11 is a block diagram of the method of the present invention 10 demonstrating the operation, function and interrelationship between the various components.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for data logging of environmental and physiological variables for domestic and feral animals comprising:
   a) a ruggadized collar;
   b) a releasable buckle element for securing and releasing said collar at a predetermined time thereby enabling the user to locate and retrieve the collar without having to track the subject animal;
   c) a data acquisition and transmission module disposed on said collar comprising:
      i) a housing having a base, a cover, fasteners with mating fastener recesses and a watertight housing ring seal disposed between said cover and said base;
      ii) a GPS receiver;
      iii) a 2 axis accelerometer angle sensor to provide data regarding the pitch and roll angle of the collar that is utilized to determine the physiological activity of the subject animal;
      iv) a temperature sensor that is thermally insulated from the collar to optimize the accuracy of data regarding the temperature of the ambient air;
      v) a VHF transceiver having a related tuning table file containing calibration and radio data to enable the user to set the outpost frequency for that specific collar;
      vi) a programmable memory card with related circuit board for storing data to configure and initiate selectable periodic operation of the various components and storing data acquired therefrom; and
      vii) a memory card storage port with access door and watertight seal;
   d) a field replaceable power supply module disposed on said collar having at least one battery disposed therein wherein said batteries are replaced by switching out said power supply module from said collar;
   e) an external magnet slot for receiving an enable/disable magnet which disables said unit when placed in said slot and enables it when removed therefrom; and
   f) means for receiving and interpreting a beacon and data transmitted by said VHF transceiver.

2. The data logging apparatus recited in claim 1, wherein said memory card is an SD memory card having a text file that provides full configurability and can be edited by any text editor.

3. The data logging apparatus recited in claim 2, wherein aspects of configurability that are user controlled and field programmable using the text files on said SD memory card include:
   a) position fix rate;
   b) number of retries until sleep at each fix;
   c) minimum number of satellites for a valid fix;
   d) number of times to retry for minimum satellites;
   e) beacon/data channel number;
   f) beacon transmit number;
   g) download parameters as defined by the number of positions to report and number of tries for each position;
   h) unit data ID comprising a user programmable text/numerical tag; and
   i) all calibration coefficients
   j) a motion and date dependant mode control parameters.

4. The data logging apparatus recited in claim 3, wherein said SD memory card is field replaceable by removing said access door and switching out said memory card.

5. The data logging apparatus recited in claim 3, wherein battery consumption and life is a primary consideration during configuration factors regarding duration and frequency.

6. The data logging apparatus recited in claim 5, wherein said GPS receiver periodically provides for location coordinates as preprogrammed during configuration and stores the received data on said SD card for storage and transmission.

7. The data logging apparatus recited in claim 6, wherein said angle sensor and said temperature sensor are polled upon validation of said GPS data.

8. The data logging apparatus recited in claim 7, wherein said VHF transceiver transmits collected data once the data has been stored thereby enabling the remote telemetry receiver and computing device to collect said data if desired.

9. The data logging apparatus recited in claim 8, wherein said circuit goes to sleep until the next scheduled wakeup.

10. The data logging apparatus recited in claim 1, wherein said means for retrieving is a beacon thereby enabling the remote telemetry receiver to locate said collar.

11. The data logging apparatus recited in claim 1, wherein said releasable buckle element has a release mechanism comprising:
   a) a female latch element comprising;
      i) an electronic controller;
      ii) a lock pin motor; and
      iii) a lock pin drive;
   b) a male latch member comprising:
      i) a lock pin; and
      ii) a pair of spaced apart alignment pins.

12. The apparatus for data logging as recited in claim 1 further comprising said collar with a component distribution whereby the orientation of the data acquisition and transmission module is maintained in an erect position due to the weight of the power supply module.

13. A method for data logging of environmental and physiological variables for domestic and feral animals sequentially following the steps of
   a) starting from power up;
   b) initializing peripherals and self test;
   c) loading program parameters from file;
   d) creating default file if none exist;
   e) verifying data file;
   f) creating data file if none exist;
   g) configuring radio;
   h) reading sensor data;
   i) configuring GPS receiver and getting initial fix;
   j) initiating sleep mode;
   k) waking up from sleep mode;
   l) initializing peripherals and self test; and
   m) reading sensor data.

14. The method recited in claim 13, wherein normal mode or motion is detected upon reading said sensor data further includes the steps of:
   a) configuring GPS receiver and getting fix;
   b) refining position fix as programmed;

c) performing radio operations;

d) recording data to file; and e) returning to sleep mode.

15. The method recited in claim 13, wherein no motion or date/battery expiration is detected upon reading said sense data includes the steps of:

a) initiating beacon only mode;

b) returning to sleep mode;

c) setting wake up clock to beacon mode;

d) transmitting beacon; and e) returning to sleep mode.

\* \* \* \* \*